Aug. 29, 1933.  H. C. DAVIS  1,924,596
DOG LEASH
Filed July 27, 1932

WITNESSES
J. E. Dickinson
E. O. Johns

INVENTOR.
Harry C. Davis
BY Brown, Critchlow & Flick
his ATTORNEYS

Patented Aug. 29, 1933

1,924,596

UNITED STATES PATENT OFFICE 1,924,596

DOG LEASH

Harry C. Davis, Pittsburgh, Pa.

Application July 27, 1932. Serial No. 625,062

2 Claims. (Cl. 119—109)

My invention relates to an animal leash and more particularly to a leash intended for use in handling dogs, although it is not necessarily so limited.

An object of the invention is to provide a leash of this character which is simple of construction, comparatively inexpensive to manufacture and which is adapted to be used without alteration as either a simple leading leash or as a choker leash.

Another object is to provide a leash embodying the aforementioned features which is made of resilient material especially adapting it for use in handling and mastering fractious animals.

Figure 1:
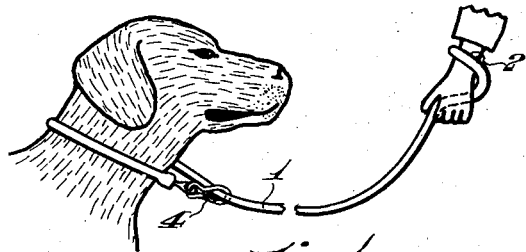
Figure 2:
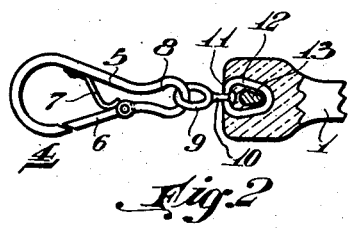
Figure 3:
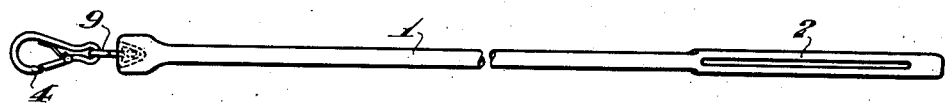
Figure 4:
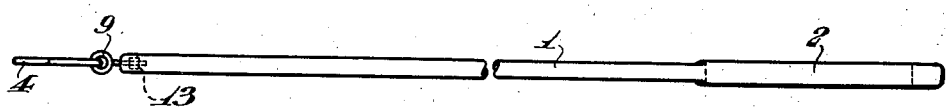

These and other objects as well as the various other novel features and advantages of the invention will become apparent when the following detailed description is read in conjunction with the accompanying drawing, of which Figure 1 is a perspective view of what is now considered to be the preferred form of the invention, illustrating it being employed as a choke leash; Fig. 2 an enlarged view of the snap which is attached to the end of the leash; Fig. 3 a side view to larger scale of the leash (shown in Fig. 1); Fig. 4 a similar view of the leash rotated 90°, and Fig. 5 a perspective view of a modification of the invention.

Referring to the drawing, the numeral 1 designates generally a leash, which in accordance with my invention is formed of strong, relatively highly flexible rubber or material having similar characteristics. At one end of this cable an elongate loop 2 is provided, which is so shaped as to form either a grip by which the user can hold the leash, or a flexible band which may be slipped over the hand and fastened to the wrist, for conveniently and securely holding a dog. On the other end of the leash, a snap 4 is attached, being provided for attaching the leash to the dog's collar in the usual fashion and for also engaging the body of the leash when the latter is passed through the loop of the snap in the manner shown in Fig. 1 to form a choke leash.

Although it may take other form, as illustrated here this snap comprises a hook-shaped body portion 5 having a hinge jaw 6 mounted on it to form the mouth of the snap, and a spring 7 secured in the loop thereof in a manner to bear against and constantly urge the jaw to a closed position. The lower end of the body portion 5 is bent into a small loop 8 and through this a link 9 is mounted. The lower end of this link is formed by a single strand 10 which is passed through an eye 11 in a ring 12 and its end upset to form a swivel connection between it and the ring. To connect the snap to the leash, ring 12 is mounted in the end of the cable, a small transverse plug 13 being mounted with the ring when the cast is made, to more firmly hold the ring in the end of the cable.

Figure 5:
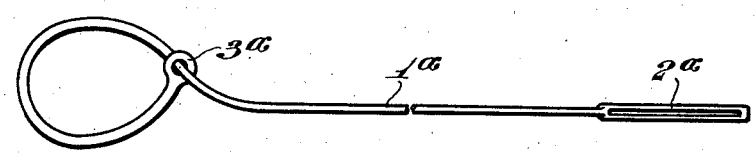

As a modification of the invention, the snap may be eliminated as shown in Fig. 5 wherein an eye 3a is provided in the attaching end of the leash which is large enough to receive the other end and through which the latter is passed to form a loop to engage the dog's collar, or slip over the dog's head and form a choke. With a leash constructed in this fashion I have discovered that due to the flexibility of the rubber if a dog attempts to pull itself loose, by lunging and pulling, it can be readily unbalanced and mastered by merely pulling and releasing the leash, also that when used as a choke, due to the give in the rubber the noose readily releases itself as soon as the tension in the leash is relieved.

In addition to the foregoing, such a leash is exceedingly easy to make, is capable of long usage and will not be destroyed by a dog chewing it, which is a fault of most leather and similar leashes.

According to the provisions of the Patent Statutes, I have explained the principle, construction and mode of use of my invention, and have described what I now consider to be its best embodiment. However, I desire to have it understood that, within the scope of the appended claims, the invention may be practiced otherwise than as specifically illustrated and described.

I claim:

1. An animal leash comprising an elongated cable formed of strong flexible rubber or material having like properties, having a grip on one end and means on the other for readily attaching it to an animal's collar.

2. A molded animal leash comprising a strong flexible elongated rubber cable having an integral grip on one end and a swivelly mounted snap secured in the other end, said snap having one end embedded in the cable and so designed as to be firmly held in place by the portion of the cable surrounding it.

HARRY C. DAVIS.